(12) United States Patent
Nagase

(10) Patent No.: US 7,104,145 B2
(45) Date of Patent: *Sep. 12, 2006

(54) TORQUE SENSOR

(75) Inventor: Shigeki Nagase, Nabari (JP)

(73) Assignee: Koyo Seiko Co., Ltd., Osaka (JP)

( * ) Notice: Subject to any disclaimer, the term of this patent is extended or adjusted under 35 U.S.C. 154(b) by 36 days.

This patent is subject to a terminal disclaimer.

(21) Appl. No.: 10/816,090

(22) Filed: Apr. 1, 2004

(65) Prior Publication Data

US 2004/0194558 A1 Oct. 7, 2004

(30) Foreign Application Priority Data

Apr. 2, 2003 (JP) ............................. 2003-099193

(51) Int. Cl.
 *G01L 3/02* (2006.01)
(52) U.S. Cl. ................................... 73/862.326
(58) Field of Classification Search ........... 73/862.326; 702/41, 151
 See application file for complete search history.

(56) References Cited

U.S. PATENT DOCUMENTS

| 4,444,064 A | | 4/1984 | Wolfinger | |
|---|---|---|---|---|
| 4,513,628 A | | 4/1985 | Kohama et al. | |
| 4,805,463 A | * | 2/1989 | Kelledes et al. | 73/862.331 |
| 4,874,053 A | * | 10/1989 | Kimura et al. | 180/443 |
| 5,398,555 A | * | 3/1995 | Ueno et al. | 73/862.326 |
| 6,456,090 B1 | | 9/2002 | Ishikawa et al. | |
| 6,520,031 B1 | * | 2/2003 | Madni et al. | 73/862.326 |
| 6,628,343 B1 | * | 9/2003 | Yamaguchi et al. | 348/731 |
| 6,892,588 B1 | * | 5/2005 | Nagase et al. | 73/862.326 |

FOREIGN PATENT DOCUMENTS

| EP | 1 134 567 | 9/2001 |
|---|---|---|
| JP | 2002-350181 | 12/2002 |

\* cited by examiner

*Primary Examiner*—Max Noori
(74) *Attorney, Agent, or Firm*—Jordan and Hamburg, LLP

(57) ABSTRACT

The torque sensor outputs a signal from a first detector which corresponds to the rotation angle of a first shaft, as a first alternating signal the phase of which changes in accordance with this change in the rotation angle, via a resistance and a capacitor which function as a low-pass filter and a high-pass filter. A signal is output from a second detector corresponding to the change in the rotation angle of a second shaft capable of performing relative rotation, elastically, with respect to the first shaft, as a second alternating signal, the phase of which changes in accordance with the change in the rotation angle, via a resistance and a capacitor which function as a low-pass filter and high-pass filter. A value corresponding to the torque transmitted by the first and second shafts is determined from a phase difference correspondence signal the waveform of which changes in accordance with change in the phase difference between the first alternating signal and the second alternating signal.

3 Claims, 7 Drawing Sheets

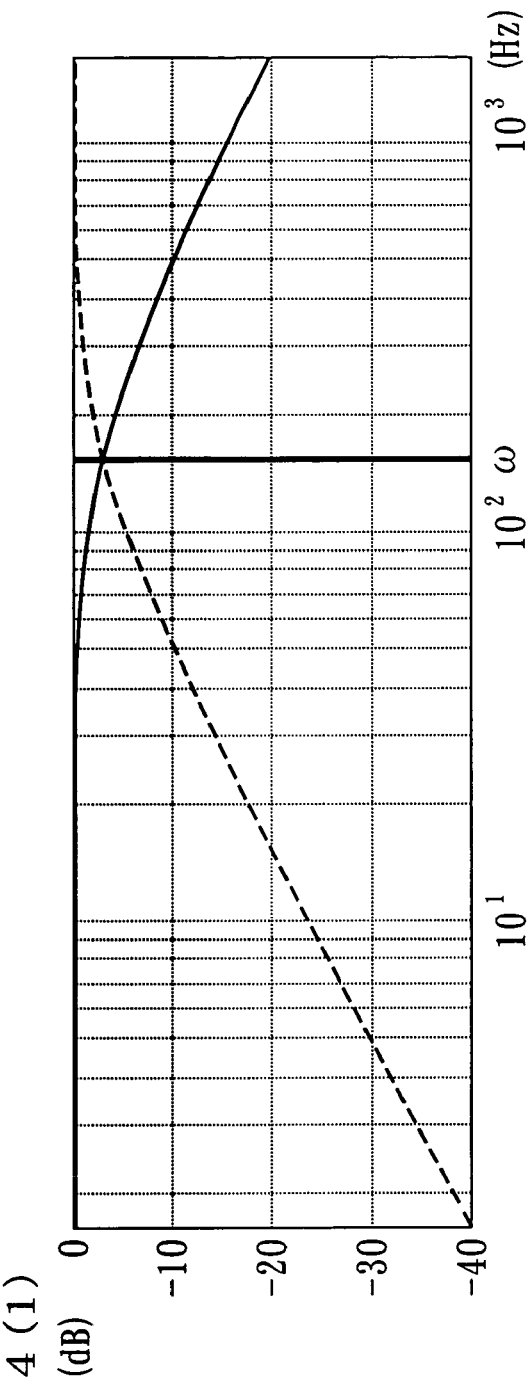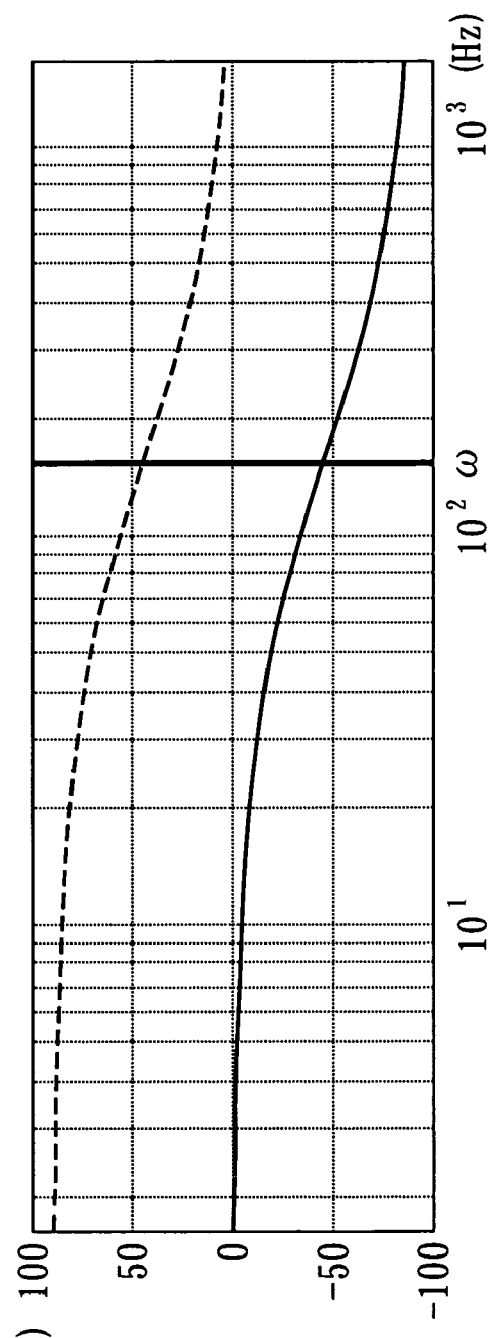
Fig. 4 (1)
Fig. 4 (2)

Fig. 5 (1)
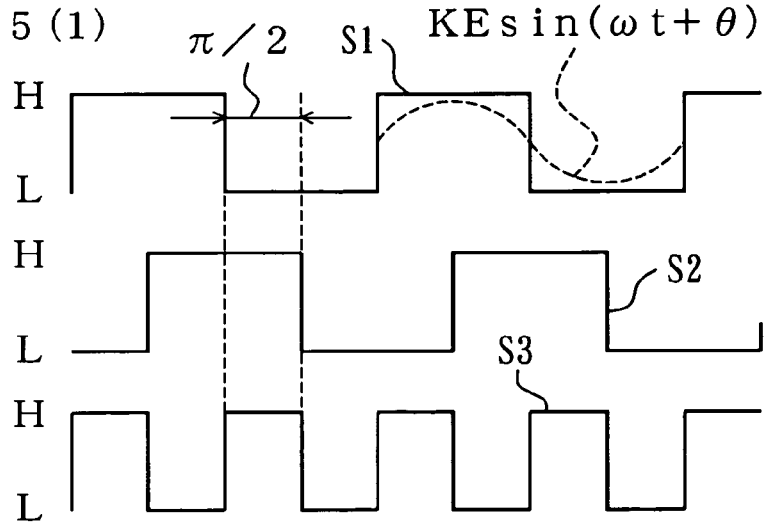
Fig. 5 (2)
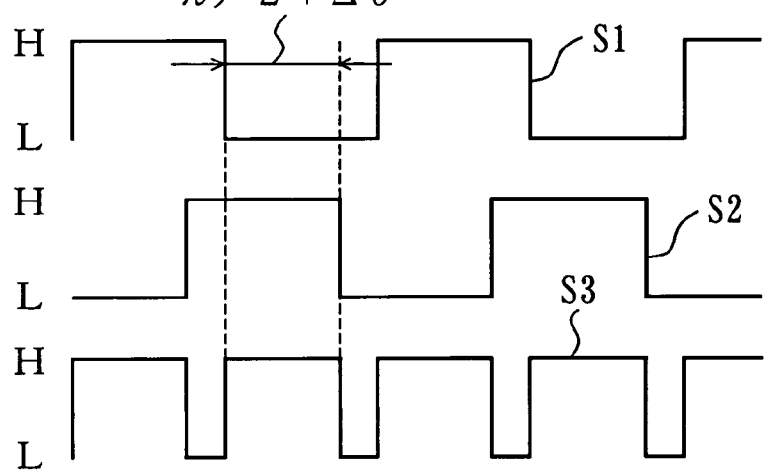
Fig. 5 (3)
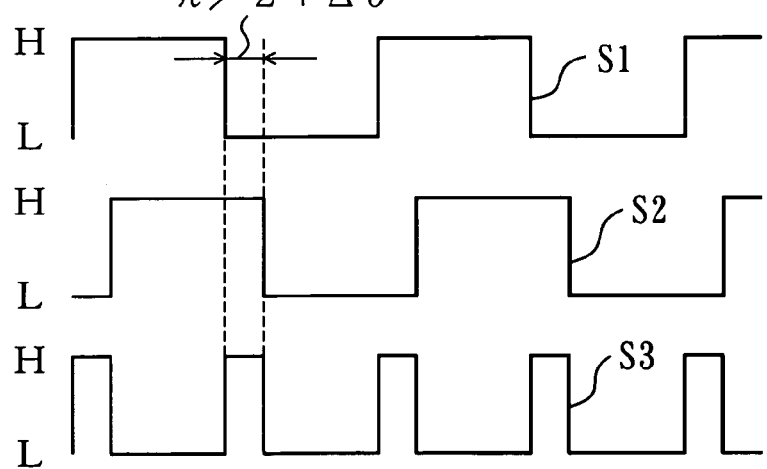

Fig. 7 (1)
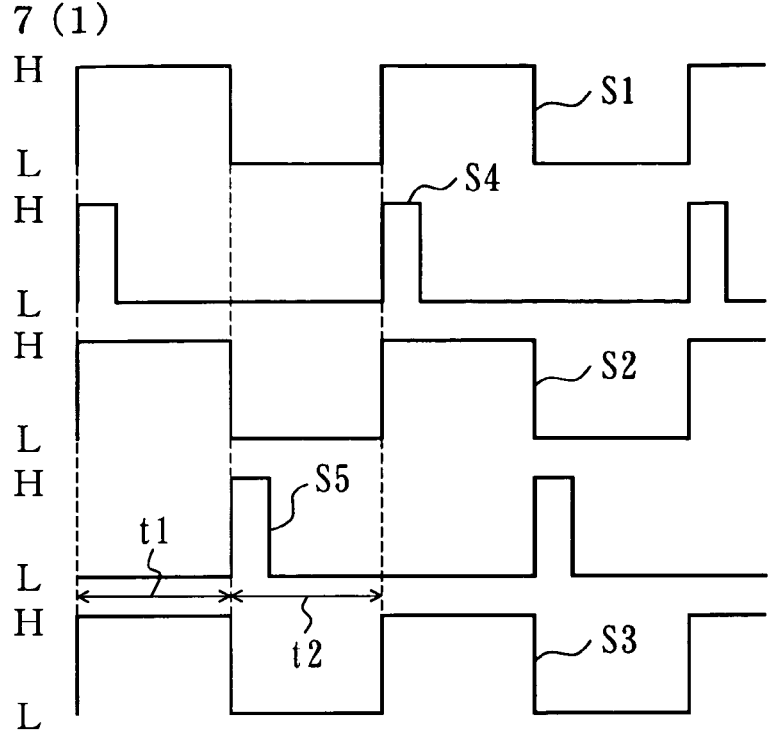
Fig. 7 (2)
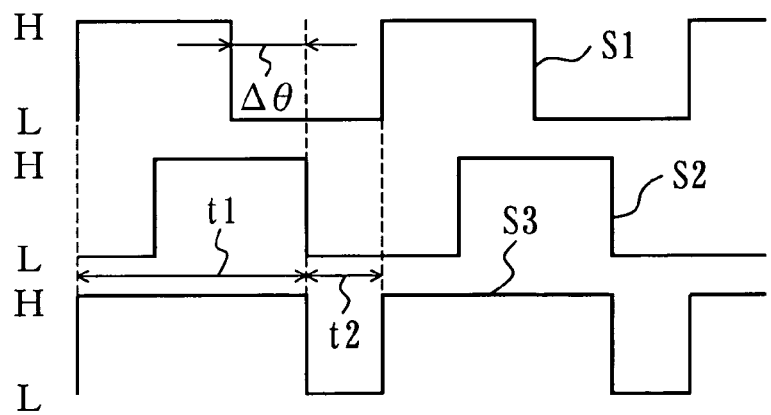
Fig. 7 (3)
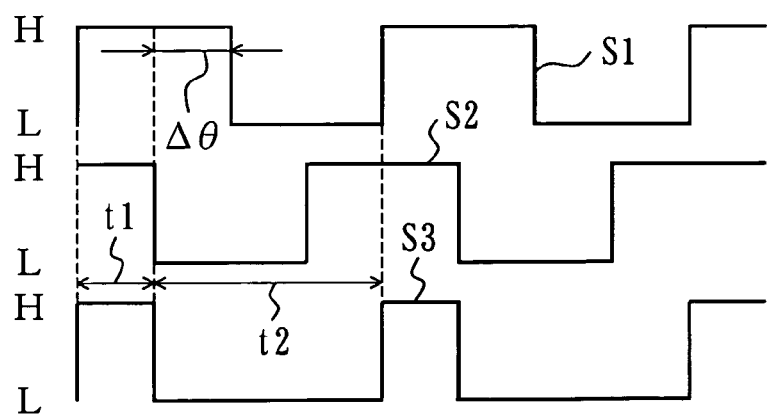

TORQUE SENSOR

FIELD OF THE INVENTION

The present invention relates to a torque sensor, which is used, for example, to detect the steering torque in an electric power steering apparatus.

DESCRIPTION OF THE RELATED ART

A torque sensor is known which comprises a first shaft, a second shaft capable of performing relative rotation, elastically, with respect to the first shaft, a first resolver for detecting the rotation angle of the first shaft and a second resolver for detecting the rotation angle of the second shaft. The torque transmitted by the two shafts is determined by the rotation angle of the first shaft as detected by the first resolver and the rotation angle of the second shaft as detected by the second resolver (Japanese Patent Laid-open No. 2002-350181).

Taking the rotation angle of the shaft as detected by the resolver to be $\theta$, the angular frequency of the excitation signal to be $\omega$, the time to be t, and KE to be a coefficient, then when an excitation signal proportional to $\sin(\omega t)$ has been input to the rotor coil of the resolver, a signal expressed by $KE \sin(\omega t) \sin \theta$ having an amplitude proportional to $\sin \theta$ and a signal expressed by $KE \sin(\omega t) \cos \theta$ having an amplitude proportional to $\cos \theta$ are output from two phase stator coils. Therefore, the rotation angle $\theta$ can be determined by calculating $\tan^{-1} (\sin \theta / \cos \theta)$ by means of a computer.

However, since there are limits on the resolution that can be achieved if a computer directly reads in the signal output value from detectors, such as resolvers, then the resolution of the torque sensor is restricted, and the workload involved in signal processing increases, as the resolution becomes higher. Moreover, since the output value changes in a non-linear fashion with respect to the rotation angle $\theta$, improvement in the torque detection accuracy is impeded. It is an object of the present invention to provide a torque sensor whereby the aforementioned problems can be resolved.

SUMMARY OF THE INVENTION

The torque sensor according to the present invention comprises a first shaft; a second shaft capable of performing relative rotation, elastically, with respect to the first shaft; a first alternating signal source which outputs a first alternating signal the phase of which changes in accordance with change in the rotation angle of the first shaft; a second alternating signal source which outputs a second alternating signal the phase of which changes in accordance with change in the rotation angle of the second shaft; and an output signal processing section which outputs a phase difference correspondence signal the waveform of which changes in accordance with change in the phase difference between the first alternating signal and the second alternating signal; wherein a value corresponding to the torque transmitted by the first and second shafts is determined from the phase difference correspondence signal.

By this means, since the phase change in the first alternating signal corresponds to the change in the rotation angle of the first shaft, and the phase change in the second alternating signal corresponds to the change in the rotation angle of the second shaft, the phase difference between the first alternating signal and the second alternating signal corresponds to the difference between the angles of rotation of the first shaft and the second shaft. The waveform of the phase difference correspondence signal changes in accordance with change in this difference between the angles of rotation, and therefore the phase difference correspondence signal can be used as a signal that corresponds to the torque transmitted by the first and second shafts. In other words, it is possible to determine directly the difference in the rotation angle corresponding to the transmitted torque, without detecting the rotation angle of the first shaft and the rotation angle of the second shaft respectively. Therefore, when the torque is determined, it is not necessary to directly read in signal output values from detectors by means of a computer, as in the prior art, and hence the workload involved in signal processing can be reduced and non-linear components can be eliminated.

Moreover, in the torque sensor according to the present invention, the first alternating signal source has a first detector and a first signal processing section; and taking KE as a coefficient, $\omega$ as the angular frequency of an excitation signal, t as the time and $\theta$ as the rotation angle of the first shaft, the first detector outputs a first sinusoidal amplitude signal expressed by $KE \sin(\omega t) \sin \theta$ and a first cosinusoidal amplitude signal expressed by $KE \sin(\omega t) \cos \theta$, when an excitation signal proportional to $\sin (\omega t)$ is input; the first signal processing section has a first resistance and a first capacitor connected mutually in series in a circuit which connects the output terminal of the first sinusoidal amplitude signal with the output terminal of the first cosinusoidal amplitude signal, the output signal processing section being connected to between the first resistance and the first capacitor; the resistance value of the first resistance and the capacitance value of the first capacitor are set in such a manner that the cut-off frequency becomes the value of $\omega$, when the first resistance and the first capacitor function as a low-pass filter for one of the first sinusoidal amplitude signal and the first cosinusoidal amplitude signal, while functioning as a high-pass filter for the other of the signals; the second alternating signal source has a second detector and a second signal processing section; taking KE as a coefficient, $\omega$ as the angular frequency of an excitation signal, t as the time and $\theta+\Delta\theta$ as the rotation angle of the second shaft, the second detector outputs a second sinusoidal amplitude signal expressed by $KE \sin(\omega t) \sin(\theta+\Delta\theta)$ and a second cosinusoidal amplitude signal expressed by $KE \sin(\omega t) \cos(\theta+\Delta\omega)$, when an excitation signal proportional to $\sin(\omega t)$ is input; the second signal processing section has a second resistance and a second capacitor connected mutually in series in a circuit which connects the output terminal of the second sinusoidal amplitude signal with the output terminal of the second cosinusoidal amplitude signal, the output signal processing section being connected to between the second resistance and the second capacitor; and the resistance value of the second resistance and the capacitance value of the second capacitor are set in such a manner that the cut-off frequency becomes the value of $\omega$, when the second resistance and the second capacitor function as a low-pass filter for one of the second sinusoidal amplitude signal and the second cosinusoidal amplitude signal, while functioning as a high-pass filter for the other of the signals.

Accordingly, by inputting an excitation signal proportional to $\sin(\omega t)$ to the first and second detectors, it is possible to output a first and a second alternating signals, the phase of which change in accordance with change in the angles of rotation of the first and second shafts, by means of generic components, such as detectors, namely resolvers or the like, resistances and capacitors.

Moreover, when the output signals of the first and second detectors are converted to first and second alternating signals, it is possible to increase the torque detection accuracy by causing the resistances and capacitors to function as low-pass filters and high-pass filters.

To be more precise, the output signals of the first and second detectors can be converted to first and second alternating signals without applying the present invention, provided that the accuracy thereof is not considered to be a problem. For example, if a first sinusoidal amplitude signal expressed by $KE \sin(\omega t) \sin \theta$ is converted to a signal expressed by $KE \sin(\omega t + \pi/2) \sin \theta$ by shifting the phase thereof by $\pi/2$, by means of a phase shift circuit, and if this converted signal is added to a first cosinusoidal amplitude signal expressed by $KE \sin(\omega t) \cos \theta$, by means of an adding circuit, then a first alternating signal expressed by $KE \sin(\omega t + \theta)$ is obtained. Similarly, if a second sinusoidal amplitude signal expressed by $KE \sin(\omega t) \sin (\theta + \Delta\theta)$ is converted to a signal expressed by $KE \sin(\omega t + \pi/2) \sin (\theta + \Delta\theta)$ by shifting the phase thereof by $\pi/2$, by means of a phase shift circuit, and if this converted signal is added to a second cosinusoidal amplitude signal expressed by $KE \sin(\omega t) \cos (\theta + \Delta\theta)$, by means of an adding circuit, then a second alternating signal expressed by $KE \sin(\omega t + \theta + \Delta\theta)$ is obtained. However, since there is variation in the amount of phase shift created by the phase shift circuit of this kind, it is not possible to shift the phase of the first and second sinusoidal amplitude signals accurately by $\pi/2$, and hence the torque detection accuracy declines.

By contrast, according to the present invention, one of the first sinusoidal amplitude signal expressed by $KE \sin(\omega t) \sin \theta$ and the first cosinusoidal amplitude signal expressed by $KE \sin(\omega t) \cos \theta$ is passed through a low-pass filter and the other thereof is passed through a high-pass filter, whereupon they are output to an output signal processing section connected to between the first resistance and the first capacitor, where they are mutually superimposed to form a first alternating signal. Since, before the superimposition, one of the first sinusoidal amplitude signal and the first cosinusoidal amplitude signal is passed through a low-pass filter having a cut-off frequency of $\omega$ constituted by the first resistance and the first capacitor, the high frequency component is removed from the signal, the phase is delayed by $\pi/4$, and the signal is converted to a signal of −3 dB gain, and since the other one of the first sinusoidal amplitude signal and the first cosinusoiclal amplitude signal is passed through a high-pass filter of having a cut-off frequency of $\omega$ constituted by the first resistance and the first capacitor, the low frequency component is removed from the signal, the phase is advanced by $\pi/4$, and the signal is converted to a signal of −3 dB gain. Therefore, the first alternating signal is a signal expressed by $KE \sin(\omega t + \theta)$, which is obtained by adding the first sinusoidal amplitude signal and the first cosinusoidal amplitude signal together with a relative phases difference of $\pi/2$. Similarly, the second alternating signal is a signal expressed by $KE \sin(\omega t + \theta + \Delta\theta)$, which is obtained by adding the second sinusoidal amplitude signal and the second cosinusoidal amplitude signal together with a relative phases difference of $\pi/2$. Moreover, even if there are variations in the resistance values of the first and second resistances, and/or the capacitance values of the first and second capacitors, due to individual difference, the phase difference between the signal from which the high frequency component has been removed and the signal from which the low frequency component has been removed, at the cut-off frequency of $\omega$, does not vary from $\pi/2$, and therefore decline in the torque detection accuracy can be prevented.

In the torque sensor according to the present invention, preferably, the first detector and the second detector are disposed relatively to each other, in such a manner that the phase difference between the first alternating signal and second alternating signal becomes $\pi/2$ when the torque transmitted by the first and second shafts is zero; and the output signal processing section has a first logic signal conversion circuit for converting the first alternating signal into a first logic signal; a second logic signal conversion circuit for converting the second alternating signal into a second logic signal; and a PWM processing circuit for outputting a PWM signal corresponding to the exclusive OR of the first logic signal and the second logic signal, as the phase difference correspondence signal. Thereby, it is possible to output a PWM signal the pulse width of which changes in accordance with change in the phase difference between the first alternating signal and the second alternating signal, as the phase difference correspondence signal. Moreover, this PWM signal can be output by means of generic components, such as circuits for converting the alternating signals to logic signals, and a circuit for generating a signal corresponding to the exclusive OR of the logic signals.

In the torque sensor according to the present invention, preferably, the output signal processing section has a first logic signal conversion circuit for converting the first alternating signal into a first logic signal; a second logic signal conversion circuit for converting the second alternating signal into a second logic signal; a detection circuit for the rise time of the first logic signal; a detection circuit for the fall time of the second logic signal; and a PWM processing circuit for outputting a PWM signal the rise time of which corresponds to one of either the rise time of the first logic signal or the fall time of the second logic signal, and the fall time of which corresponds to the other thereof, as the phase difference correspondence signal.

Thereby, it is possible to output a PWM signal the pulse width of which changes in accordance with change in the phase difference between the first alternating signal and the second alternating signal, as a phase difference correspondence signal. Moreover, this PWM signal can be output by means of generic components, such as circuits for converting the alternating signals to logic signals, circuits for detecting the rise time and fall time of the logic signals, and an SR flip-flop, for example, for generating a signal having a rise time and a fall time corresponding to the rise time and fall time of the logic signals.

According to the present invention, it is possible to provide a torque sensor of high accuracy and high resolution, at low cost.

BRIEF DESCRIPTION OF THE DRAWINGS

FIG. 2(2) is a diagram showing a first cosinusoidal amplitude signal in the torque sensor according to the embodiment of the present invention.

FIG. 4(1) is a Bode diagram showing the gain characteristics of the output signal in a case where the first sinusoidal amplitude signal and the first cosinusoidal amplitude signal in the embodiment of the present invention are input respectively to a low-pass filter and a high-pass filter; FIG. 4(2) is a Bode diagram showing the phase characteristics of this output signal.

FIG. 5(1) is a diagram showing a first logic signal, a second logic signal and a PWM signal, in a case where the transmitted torque is zero, in the torque sensor according to the embodiment of the present invention; FIG. 5(2) is a diagram showing a first logic signal, a second logic signal and a PWM signal, in a case where torque is transmitted in one direction, in the torque sensor according to the embodiment of the present invention; FIG. 5(3) is a diagram showing a first logic signal, a second logic signal and a PWM signal, in a case where torque is transmitted in the other direction, in the torque sensor according to the embodiment of the present invention.

FIG. 7(1) is a diagram showing a first logic signal, a second logic signal, a PWM signal, and a rise time detection signal and fall time detection signal, in a case where the transmitted torque is zero in a torque sensor according to the modification of the present invention; FIG. 7(2) is a diagram showing a first logic signal, a second logic signal, and a PWM signal in a case where torque is transmitted in one direction in the torque sensor according to the modification of the present invention; and FIG. 7(3) is a diagram showing a first logic signal, a second logic signal, and a PWM signal in a case where torque is transmitted in the other direction in the torque sensor according to the modification of the present invention.

DESCRIPTION OF THE PREFERRED EMBODIMENTS

Figure 1:
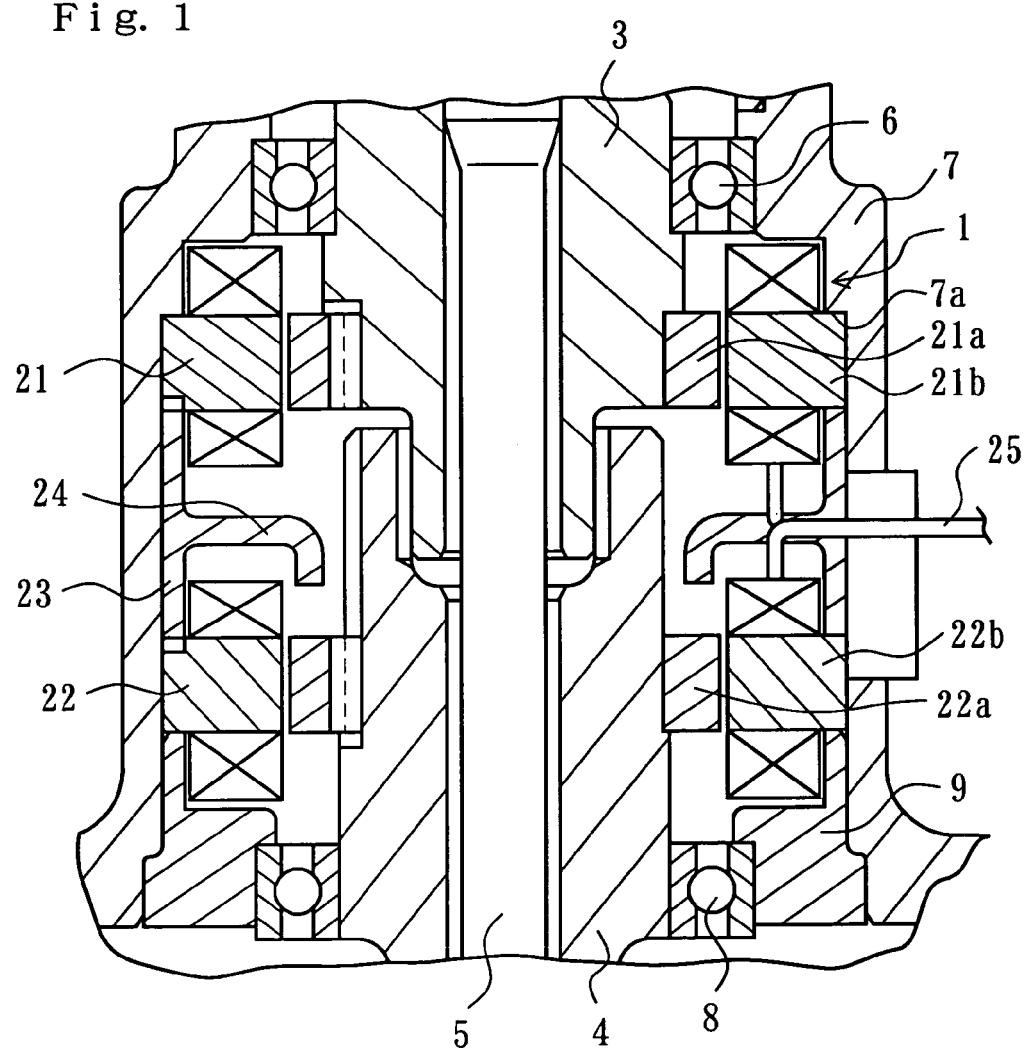
FIG. 1 is a cross-sectional view of a torque sensor according to an embodiment of the present invention.

The torque sensor 1 according to the present embodiment as illustrated in FIG. 1 is used in order to detect the torque transmitted to a steering shaft of an electric power steering apparatus, and it comprises a tubular first shaft 3 and a tubular second shaft 4 constituting the steering shaft. Rotation of a steering wheel (not illustrated) connected to the first shaft 3 is transmitted to vehicle wheels via a steering gear (not illustrated) which is connected to the second shaft 4, whereby the steering angle of the vehicle wheels is changed.

A torsion bar (elastic member) 5 is inserted into the first shaft 3 and the second shaft 4. One end of the torsion bar 5 is connected to the first shaft 3, and the other end thereof is connected to the second shaft 4, by means of a pin, serration or the like, respectively, and thus the first shaft 3 and the second shaft 4 can be rotated relatively to each other, elastically, about a common axis. The first shaft 3 is supported via a bearing 6 by a sensor housing 7, and the second shaft 4 is supported via a bearing 8 by a ring-shaped resolver pressing element 9 press-fitted into the sensor housing 7. A first resolver (first detector) 21 and a second resolver (second detector) 22 are covered by the sensor housing 7.

The first resolver 21 has a first resolver rotor 21a which is fitted onto the external circumference of the first shaft 3 in such a manner that it rotates together with the first shaft 3, and a ring-shaped first resolver stator 21b which covers the first resolver rotor 21a. In the present embodiment, the first resolver 21a rotates together with the first shaft 3 by means of the first shaft 3 being press-fitted into the first resolver rotor 21a. The second resolver 22 has a second resolver rotor 22a which is fitted onto the external circumference of the second shaft 4 in such a manner that it rotates together with the second shaft 4, and a ring-shaped second resolver stator 22b which covers the second resolver rotor 22a. In the present embodiment, the second resolver rotor 22a rotates together with the second shaft 4 by means of the second shaft 4 being press-fitted into the second resolver rotor 22a. A tubular spacer 23 is disposed between the first resolver stator 21b and the second resolver stator 22b.

The first resolver stator 21b, the second resolver stator 22b and the spacer 23 are fitted into the internal circumference of the sensor housing 7 along the axial direction of the shafts with a clearance in the radial direction of the first and second shafts 3, 4. These two resolver stators 21b, 22b and the spacer 23 are fixed to the sensor housing 7, by being sandwiched between the resolver pressing element 9 and a step 7a formed in the inner circumference of the sensor housing 7. A ring-shaped magnetic shielding part 24 extending in an inward direction from the inner circumference of the spacer 23 is formed from a magnetic shielding material, in an integral fashion with the spacer 23. A magnetic shield is created between the first resolver 21 and the second resolver 22 by the magnetic shielding section 24.

Figure 2:
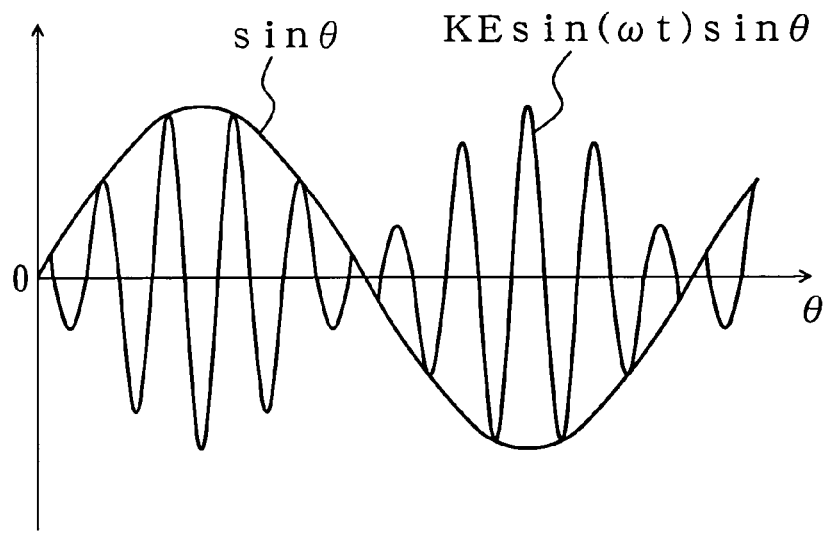
FIG. 2(1) is a diagram showing a first sinusoidal amplitude signal in a torque sensor according to the embodiment of the present embodiment.
Figure 2:
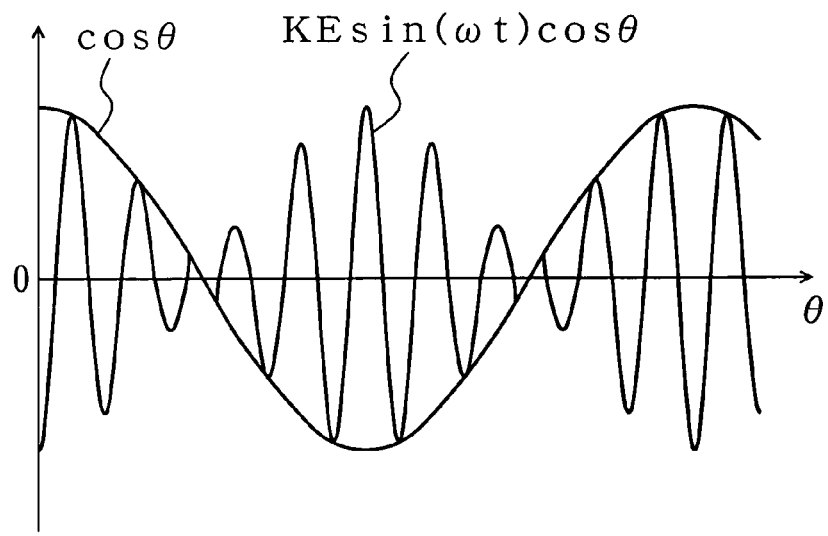

The first resolver 21 outputs a first sinusoidal amplitude signal and a first cosinusoidal amplitude signal from two phase coils (not illustrated) provided in the first resolver stator 21b, by inputting an excitation signal to a coil (not illustrated) provided in the first resolver rotor 21a. To be more precise, if the excitation signal is taken to be $E\sin(\omega t)$ and the rotation angle of the first shaft 3 is taken to be $\theta$, then the first sinusoidal amplitude signal has an amplitude proportional to $\sin\theta$, and is expressed by $KE\sin(\omega t)\sin\theta$. FIG. 2(1) shows the change in $\sin\theta$ and $KE\sin(\omega t)\sin\theta$, with respect to change in $\theta$, when the first shaft 3 turns at a constant angular speed. Moreover, the first cosinusoidal amplitude signal has an amplitude proportional to $\cos\theta$, and is expressed by $KE\sin(\omega t)\cos\theta$. FIG. 2(2) shows the change in $\cos\theta$ and $KE\sin(\omega t)\cos\theta$, with respect to change in $\theta$, when the first shaft 3 turns at a constant angular speed. E is the signal amplitude, K is the transformation ratio, $\omega$ is the angular excitation frequency, and t is time.

The second resolver 22 outputs a second sinusoidal amplitude signal and a second cosinusoidal amplitude signal, from two phase coils (not illustrated) provided in the second resolver stator 22b, by inputting an excitation signal to a coil (not illustrated) provided in the second resolver rotor 22a. If the excitation signal is taken to be $E\sin(\omega t)$, and the rotation angle of the second shaft 4 is taken to be $\theta+\Delta\theta$, then the second sinusoidal amplitude signal has an amplitude proportional to $\sin(\theta+\Delta\theta)$, and is expressed by $KE\sin(\omega t)\sin(\theta+\Delta\theta)$, and the second cosinusoidal amplitude signal has an amplitude proportional to $\cos(\theta+\Delta\theta)$ and is expressed by $KE\sin(\omega t)\cos(\theta+\Delta\theta)$.

Figure 3:
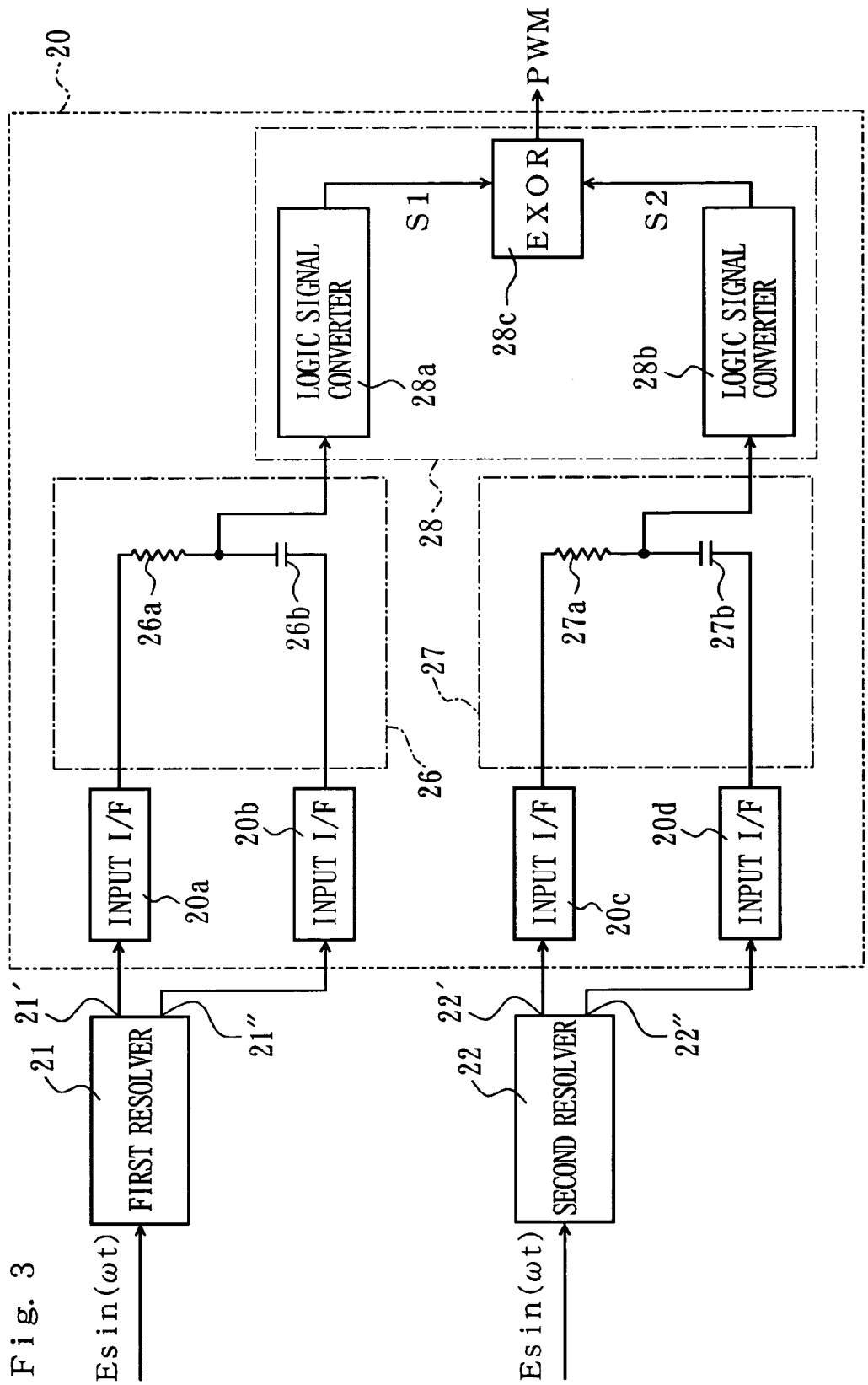
FIG. 3 is a diagram showing the constitution of a signal processing section in the torque sensor according to the embodiment of the present invention.

The output signals from the two resolvers 21, 22 are input, via a signal cable 25, to a control device 20 provided externally to the sensor housing 7 as illustrated in FIG. 3. The control device 20 comprises a first signal processing section 26, a second signal processing section 27, and an output signal processing section 28.

The first signal processing section 26 has a first resistance 26a and a first capacitor 26b connected mutually in series in a circuit which connects an output terminal 21' of the first resolver 21 for the first sinusoidal amplitude signal with an output terminal 21" of the first resolver 21 for the first cosinusoidal amplitude signal via a first sinusoidal amplitude signal input interface 20a and a first cosinusoidal amplitude signal input interface 20b. The output signal processing section 28 is connected to between the first resistance 26a and the first capacitor 26b. Thereby, the first resistance 26a and the first capacitor 26b function as a low-pass filter for the first sinusoidal amplitude signal, and function as a high-pass filter for the first cosinusoidal amplitude signal. Moreover, the resistance value of the first resistance 26a and the capacitance value of the first capacitor 26b are set in such a manner that the cut-off frequency becomes the value of $\omega$ stated above, when the first resistance 26a and the first capacitor 26b function as a low-pass filter for the first sinusoidal amplitude signal, and also function as a high-pass filter for the first cosinusoidal amplitude signal. More specifically, FIG. 4(1) shows a Bode diagram, in which the solid line indicates the gain characteristics of the output signal with respect to the first sinusoidal amplitude signal input to the low-pass filter, and the broken line indicates the gain characteristics of the output signal with respect to the first cosinusoidal amplitude signal input to the high-pass filter; and FIG. 4(2) is a Bode diagram, in which the solid line indicates the phase characteristics of the output signal with respect to the first sinusoidal amplitude signal input to the low-pass filter, and the broken line indicates the phase characteristics of the output signal with respect to the first cosinusoidal amplitude signal input to the high-pass filter. Since the first sinusoidal amplitude signal is passed through the low-pass filter which has a cut-off frequency of $\omega$ and is constituted by the first resistance 26a and the first capacitor 26b, the high frequency component thereof is removed, its phase is delayed by $\pi/4$, and it is converted to a signal of $-3$ dB gain. Moreover, since the first cosinusoidal amplitude signal is passed through the high-pass filter which has a cut-off frequency of $\omega$ and is constituted by the first resistance 26a and the first capacitor 26b, the low frequency component thereof is removed, its phase is advanced by $\pi/4$, and it is converted to a signal of $-3$ dB gain. Consequently, the first alternating signal is expressed by KE $(\sin \omega t+\theta)$, which is obtained by adding the first sinusoidal amplitude signal and the first cosinusoidal amplitude signal together with a relative phase difference of $\pi/2$. In other words, the first resolver 21 and the first signal processing section 26 constitute a first alternating signal source which outputs the first alternating signal the phase of which changes in accordance with change in the rotation angle $\theta$ of the first shaft 3. In this case, even if there are variations in the resistance value of the first resistance 26a and the capacitance value of the first capacitor 26b due to individual difference, the phase difference between the signal from which the high frequency component has been removed and the signal from which the low frequency component has been removed does not vary from $\pi/2$ at the cut-off frequency $\omega$.

The second signal processing section 27 has a second resistance 27a and a second capacitor 27b connected mutually in series in a circuit which connects an output terminal 22' of the second resolver 22 for the second sinusoidal amplitude signal with an output terminal 22" of the second resolver 22 for the second cosinusoidal amplitude signal via a second sinusoidal amplitude signal input interface 20c and a second cosinusoidal amplitude signal input interface 20d. The output signal processing section 28 is connected to between the second resistance 27a and the second capacitor 27b. Thereby, the second resistance 27a and the second capacitor 27b function as a low-pass filter for the second sinusoidal amplitude signal, and function as a high-pass filter for the second cosinusoidal amplitude signal. Moreover, the resistance value of the second resistance 27a and the capacitance value of the second capacitor 27b are set in such a manner that the cut-off frequency becomes the value of $\omega$ stated above, when the second resistance 27a and the second capacitor 27b function as a low-pass filter for the second sinusoidal amplitude signal, and also function as a high-pass filter for the second cosinusoidal amplitude signal. Since the second sinusoidal amplitude signal is passed through the low-pass filter which has a cut-off frequency of $\omega$ and is constituted by the second resistance 27a and the second capacitor 27b, the high frequency component thereof is removed, its phase is delayed by $\pi/4$, and it is converted to a signal of $-3$ dB gain. Moreover, since the second cosinusoidal amplitude signal is passed through the high-pass filter which has a cut-off frequency of $\omega$ and is constituted by the second resistance 27a and the second capacitor 27b, the low frequency component thereof is removed, its phase is advanced by $\pi/4$, and it is converted to a signal of $-3$ dB gain. Consequently, the second alternating signal is expressed by KE $\sin (\omega t+\theta+\Delta\theta)$, which is obtained by adding the second sinusoidal amplitude signal and the second cosinusoidal amplitude signal together with a relative phase difference of $\pi/2$. In other words, the second resolver 22 and the second signal processing section 27 constitute a second alternating signal source for outputs the second alternating signal the phase of which changes in accordance with change in the rotation angle $\theta+\Delta\theta$ of the second shaft 4. In this case, even if there are variations in the resistance value of the second resistance 27a and the capacitance value of the second capacitor 27b due to individual difference, the phase difference between the signal from which the high frequency component has been removed and the signal from which the low frequency component has been removed does not vary from $\pi/2$ at the cut-off frequency $\omega$.

The first resolver 21 and the second resolver 22 are disposed relatively to each other, in such a manner that the phase difference between the first alternating signal and the second alternating signal is $\pi/2$, when the torque transmitted by the first and second shafts 3, 4 is zero.

The output signal processing section 28 has a first logic signal conversion circuit 28a, a second logic signal conversion circuit 28b, and a PWM processing circuit 28c.

The first logic signal conversion circuit 28a converts the first alternating signal into a first logic signal. The first logic signal is represented by a binary square wave which takes the value H or L, and which has the same frequency as the first alternating signal. The second logic signal conversion circuit 28b converts the second alternating signal into a second logic signal. The second logic signal is represented by a binary square wave which takes the value H or L, and which has the same frequency as the second alternating signal. The phase difference between the first alternating signal and the second alternating signal becomes equal to the phase difference between the first logic signal and the second logic signal.

The PWM processing circuit 28c outputs a PWM signal corresponding to an exclusive OR(EXOR) of the first logic signal and the second logic signal. In the present embodiment, the PWM duty determined from the PWM signal is used as a value corresponding to the torque transmitted by the first and second shafts 3, 4. To be more precise, FIG. 5(1) shows a first logic signal S1, a second logic signal S2, and a PWM signal S3 output by the PWM processing circuit 28c, when the transmitted torque is zero. In this case, the phase difference between the first logic signal S1 and the second logic signal S2 is $\pi/2$, and the PWM duty is 50%. FIG. 5(2) shows a first logic signal S1, a second logic signal S2, and a PWM signal S3 in a case where torque is transmitted in one direction by the first and second shafts 3, 4. In this case, the phase difference between the first logic signal S1 and the second logic signal S2 is $\pi/2+\Delta\theta$ ($\Delta\theta>0$), and as the transmitted torque increases, the PWM duty rises above 50%. FIG. 5(3) shows a first logic signal S1, a second logic signal S2 and a PWM signal S3 in a case where torque is transmitted in the other direction by the first and second shafts 3, 4. In this case, the phase difference between the first logic signal S1 and the second logic signal S2 is $\pi/2+\Delta\theta$ ($\Delta\theta<0$), and as the transmitted torque increases, the PWM duty decreases below 50%.

Since the phase change in the first alternating signal corresponds to the change in the rotation angle of the first shaft 3, and the phase change in the second alternating signal corresponds to the change in the rotation angle of the second shaft 4, then the phase difference between the first alternating signal and the second alternating signal corresponds to the transmitted torque, which corresponds to the difference in the rotation angle of the first shaft 3 and the second shaft 4. Since this phase difference between the first alternating signal and the second alternating signal is equal to the phase difference between the first logic signal S1 and the second logic signal S2, then the PWM signal S3 corresponding to the exclusive OR of the first logic signal S1 and second logic signal S2 is a phase difference correspondence signal the waveform of which changes as the pulse width changes in accordance with the change in the phase difference between the first alternating signal and the second alternating signal. This PWM signal S3 is used as a signal corresponding to the torque transmitted by the first and second shafts 3, 4. In the present embodiment, a steering assist power corresponding to the torque transmitted by the first and second shafts 3, 4 is calculated from the previously established and stored relationship between the PWM duty and the steering assist power, and an electric actuator (not illustrated) for generating the steering assist power is controlled in such a manner that it generates the steering assist power thus calculated. A commonly known system can be used for the electric actuator for generating the steering assist power, for example, a system can be used wherein the steering assist power generated by an electric motor is transmitted to the steering shaft by means of a reduction gear mechanism.

According to the torque sensor 1 of the aforementioned embodiment, it is possible to determine directly the difference in the rotation angle, which corresponds to the transmitted torque, without detecting the rotation angle of the first shaft 3 and the rotation angle of the second shaft 4 respectively. Therefore, there is no need to read in the signal output values directly from the first and second resolvers 21, 22 in order to determine the torque, and hence the workload required for signal processing can be reduced and non-linear components can be eliminated. By inputting an excitation signal which is proportional to sin ($\omega$t) to the first and second resolvers 21, 22, it is possible to output a first and second alternating signal the phases of which change in accordance with change in the rotation angle of the first and second shafts 3, 4, by means of generic components, viz. the resolvers 21, 22, the resistances 26a, 27a, and the capacitors 26b, 27b. Moreover, even if there are variations in the resistance values of the first and second resistances 26a, 27a or the capacitance values of the first and second capacitors 26b, 27b, due to individual difference, it is possible to prevent decline in the torque detection accuracy, because the resistances 26a, 27a and the capacitors 26b, 27b function as a low-pass filter and a high-pass filter in order that the phase difference between the signal from which the high frequency component has been removed and the signal from which the low frequency component has been removed does not vary from $\pi/2$ at the cut-off frequency $\omega$.

Furthermore, it is possible to output a PWM signal the pulse width of which changes in accordance with change in the phase difference between the first alternating signal and the second alternating signal, by means of generic components, viz. the logic signal conversion circuits 28a, 28b which convert the alternating signals into logic signals, and the PWM processing circuit 28c which generates a signal corresponding to the exclusive OR of the logic signals.

Figure 6:
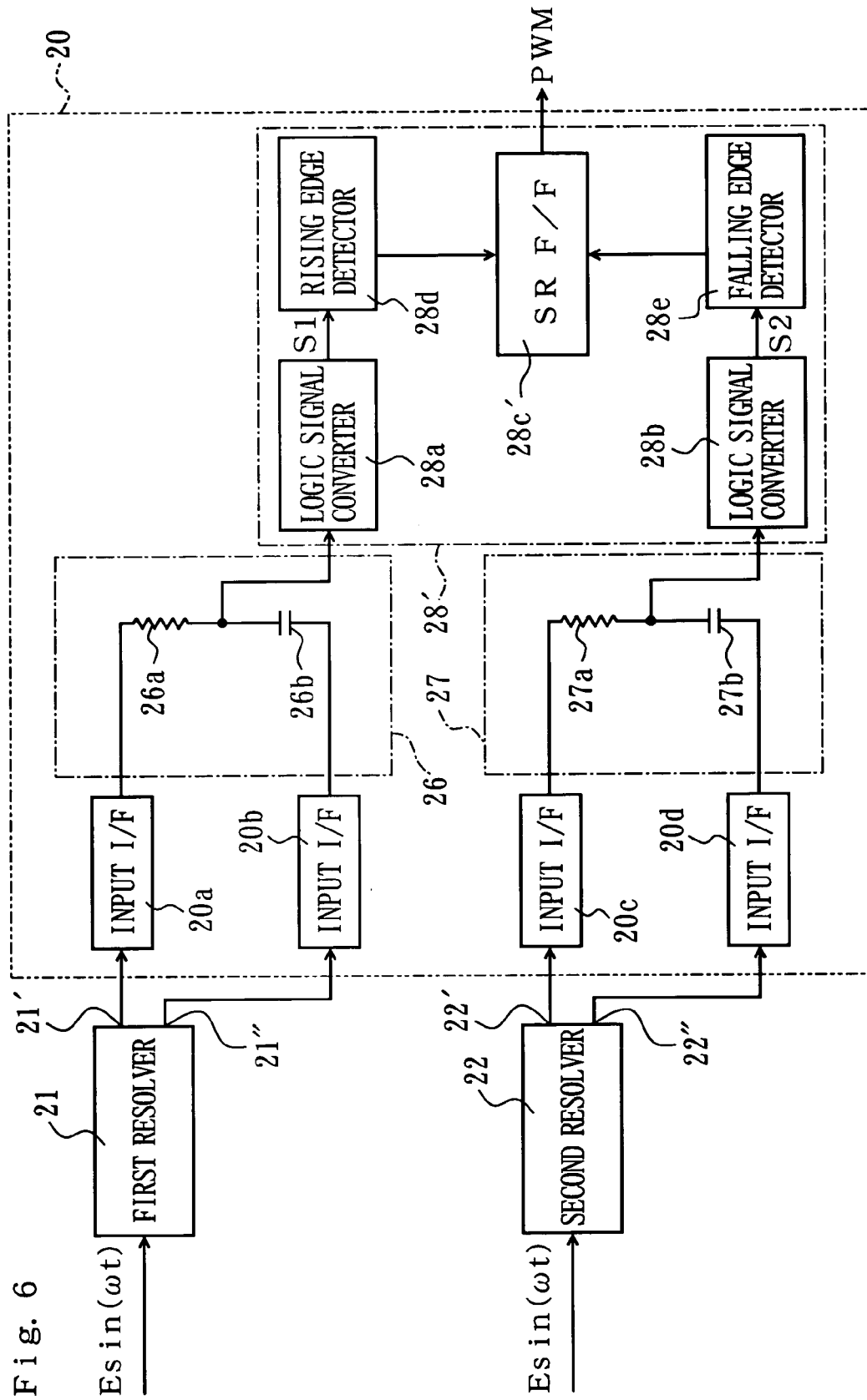
FIG. 6 is a diagram showing the constitution of a signal processing section in a torque sensor according to a modification of the present invention.

FIG. 6, FIG. 7(1), FIG. 7(2) and FIG. 7(3) show a modification of the control device 20. Here, the difference from the embodiment described above is that the first resolver 21 and the second resolver 22 are positioned relatively in such a manner that the phase difference between the first alternating signal and the second alternating signal becomes zero when the torque transmitted by the first and second shafts 3, 4 becomes zero. The output signal processing section 28' has a rise time detecting circuit 28d for the first logic signal which is output from the first logic signal conversion circuit 28a, and a fall time detecting circuit 28e for the second logic signal which is output from the second logic signal conversion circuit 28b. The PWM processing circuit 28c' has an SR (Set Reset) flip-flop, instead of a circuit for outputting a PWM signal which corresponds to the exclusive OR of the first logic signal and the second logic signal. The rise time detection signal for the first logic signal is input to the S terminal of the flip-flop constituting the PWM processing circuit 28c', and the fall time detection signal for the second logic signal is input to the R terminal thereof. Accordingly, a PWM signal is output from the PWM processing circuit 28c'. The PWM duty of this PWM signal corresponds to the torque transmitted by the first and second shafts 3, 4.

To be more precise, FIG. 7(1) shows a first logic signal S1, a second logic signal S2, a PWM signal S3 output by the PWM processing circuit 28c', a rise time detection signal S4, and a fall time detection signal S5, in a case where the transmitted torque is zero. In this case, $\Delta\theta=0$, the phase difference between the first logic signal and the second logic signal is zero, and since the time period t1 from the rise time of the first logic signal until the fall time of the second logic signal is equal to the time period t2 from the fall time of the second logic signal until the rise time of the first logic signal, then the PWM duty is 50%. FIG. 7(2) shows the first logic signal S1, the second logic signal S2 and the PWM signal S3 in a case where torque is transmitted in one direction by the first and second shafts 3, 4.

In this case, the phase difference between the first logic signal and the second logic signal becomes $\Delta\theta(>0)$, and the time period t1 from the rise time of the first logic signal until the fall time of the second logic signal is longer than the time period t2 from the fall time of the second logic signal until the rise time of the first logic signal, and therefore as the transmitted torque increases, the PWM duty rises above 50%. FIG. 7(3) shows the first logic signal S1, the second logic signal S2 and the PWM signal S3 in a case where a torque is transmitted in the other direction by the first and second shafts 3, 4. In this case, the phase difference between the first logic signal and the second logic signal becomes $\Delta\theta$ (<0), and the time period t1 from the rise time of the first logic signal until the fall time of the second logic signal is shorter than the time period t2 from the fall time of the second logic signal until the rise time of the first logic signal, and therefore as the transmitted torque increases, the PWM duty decreases below 50%. Accordingly, it is possible to output a PWM signal the pulse width of which changes in accordance with change in the phase difference between the first alternating signal and the second alternating signal, by means of generic components, viz. the logic signal conversion circuits 28a, 28b for converting alternating signals into logic signals, the circuits 28d, 28e for detecting the rise time and fall time of logic signals, and the SR flip-flop for generating a signal having a rise time and a fall time which correspond to the rise time and fall time of the logic signals. The rest parts are the same as those of the foregoing embodiment, and the same parts are labeled with the same reference numerals. The fall time detection signal for the second logic signal can be input to the S terminal of the SR flip-flop constituting the PWM processing circuit 28c', and the rise time detection signal for the first logic signal can be input to the R terminal thereof. Therefore, the PWM processing circuit 28c' can outputs a phase difference correspondence signal in the form of a PWM signal the rise time of which corresponds to one of either the rise time of the first logic signal or the fall time of the second logic signal, and the fall time of which corresponds to the other thereof.

The present invention is not limited to the aforementioned embodiment or modification.

For example, the mutual arrangement of the first resistance 26a and the first capacitor 26b can be opposite to that in the aforementioned embodiment and modification, in such a manner that the first resistance 26a and the first capacitor 26b function as a low-pass filter for the first cosinusoidal amplitude signal, while also functioning as a high-pass filter for the first sinusoidal amplitude signal. Moreover, the mutual arrangement of the second resistance 27a and the second capacitor 27b can be opposite to that of the aforementioned embodiment and modification, in such a manner that the second resistance 27a and the second capacitor 27b function as a low-pass filter for the second cosinusoidal amplitude signal, while also functioning as a high-pass filter for the second sinusoidal amplitude signal. Moreover, in the foregoing embodiment and modification, the PWM duty of the PWM signal output by the output signal processing sections 28, 28' is used as a value corresponding to the transmitted torque, but it is also possible to use the time integral of the PWM signal as a value corresponding to the transmitted torque.

What is claimed is:

1. A torque sensor comprising:
    a first shaft;
    a second shaft capable of performing relative rotation, elastically, with respect to said first shaft;
    a first alternating signal source which outputs a first alternating signal the phase of which changes in accordance with change in the rotation angle of said first shaft;
    a second alternating signal source which outputs a second alternating signal the phase of which changes in accordance with change in the rotation angle of said second shaft; and
    an output signal processing section which outputs a phase difference correspondence signal the waveform of which changes in accordance with change in the phase difference between said first alternating signal and said second alternating signal,
    wherein said first alternating signal source has a first detector and a first signal processing section;
    taking KE as a coefficient, ω as the angular frequency of an excitation signal, t as the time and θ as the rotation angle of the first shaft, said first detector outputs a first sinusoidal amplitude signal expressed by KE sin(ωt) sin θ and a first cosinusoidal amplitude signal expressed by KE sin(ωt) cos θ, when an excitation signal proportional to sin (ωt) is input;
    said first signal processing section has a first resistance and a first capacitor connected mutually in series in a circuit which connects the output terminal of said first sinusoidal amplitude signal with the output terminal of said first cosinusoidal amplitude signal, said output signal processing section being connected to between said first resistance and said first capacitor;
    the resistance value of said first resistance and the capacitance value of said first capacitor are set in such a manner that the cut-off frequency becomes said value of ω, when said first resistance and said first capacitor function as a low-pass filter for one of said first sinusoidal amplitude signal and said first cosinusoidal amplitude signal, while functioning as a high-pass filter for the other of said signals,
    said second alternating signal source has a second detector and a second signal processing section;
    taking KE as a coefficient, ω as the angular frequency of an excitation signal, t as the time and θ+Δθ as the rotation angle of the second shaft, said second detector outputs a second sinusoidal amplitude signal expressed by KE sin(ωt) sin(θ+Δθ) and a second cosinusoidal amplitude signal expressed by KE sin(ωt) cos(θ+Δθ), when an excitation signal proportional to sin(ωt) is input;
    said second signal processing section has a second resistance and a second capacitor connected mutually in series in a circuit which connects the output terminal of said second sinusoidal amplitude signal with the output terminal of said second cosinusoidal amplitude signal, said output signal processing section being connected to between said second resistance and said second capacitor;
    the resistance value of said second resistance and the capacitance value of said second capacitor are set in such a manner that the cut-off frequency becomes said value of ω, when said second resistance and said second capacitor function as a low-pass filter for one of said second sinusoidal amplitude signal and said second cosinusoidal amplitude signal, while functioning as a high-pass filter for the other of said signals; and
    a value corresponding to the torque transmitted by said first and second shafts being determined from said phase difference correspondence signal.

2. The torque sensor according to claim 1, wherein said first detector and said second detector are disposed relatively to each other, in such a manner that the phase difference between said first alternating signal and second alternating signal becomes π/2 when the torque transmitted by said first and second shafts is zero; and
    said output signal processing section has a first logic signal conversion circuit for converting said first alternating signal into a first logic signal; a second logic signal conversion circuit for converting said second alternating signal into a second logic signal; and a PWM processing circuit for outputting a PWM signal corresponding to the exclusive OR of said first logic signal and said second logic signal, as said phase difference correspondence signal.

3. The torque sensor according to claim 1, wherein said output signal processing section has a first logic signal conversion circuit for converting said first alternating signal into a first logic signal; a second logic signal conversion circuit for converting said second alternating signal into a second logic signal; a
    detection circuit for the rise time of said first logic signal; a detection circuit for the fall time of said second logic signal; and a PWM processing circuit for outputting a PWM signal the rise time of which corresponds to one of either the rise time of said first logic signal or the fall time of said second logic signal, and the fall time of which corresponds to the other thereof, as said phase difference correspondence signal.

* * * * *